INVENTOR.
DAVID LORD SUTTER

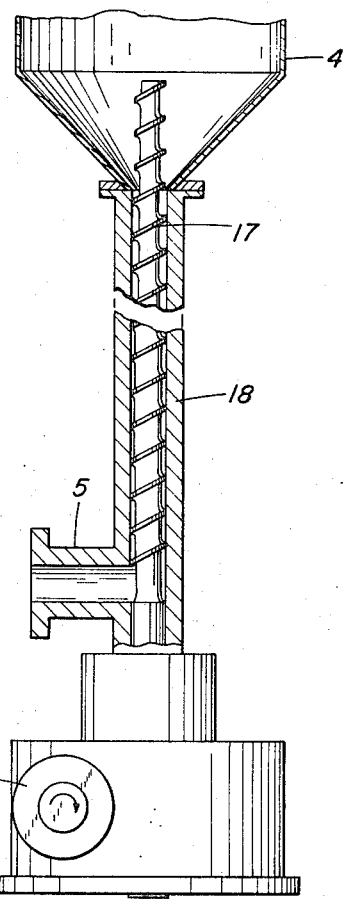
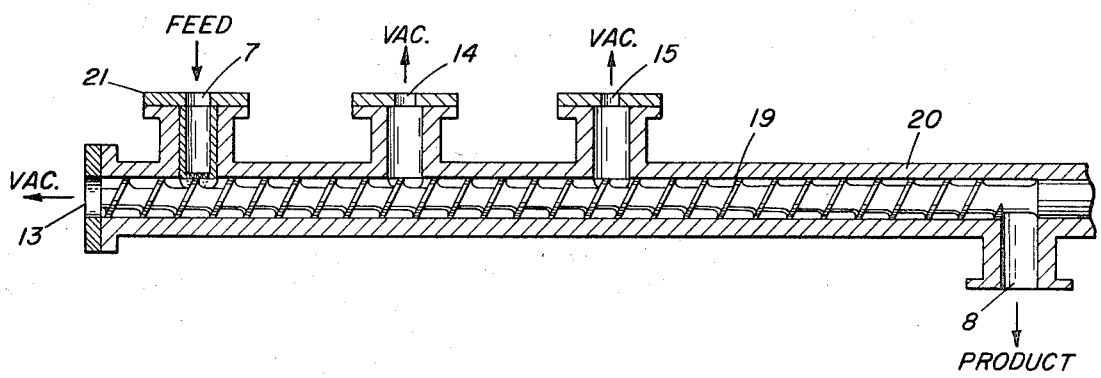

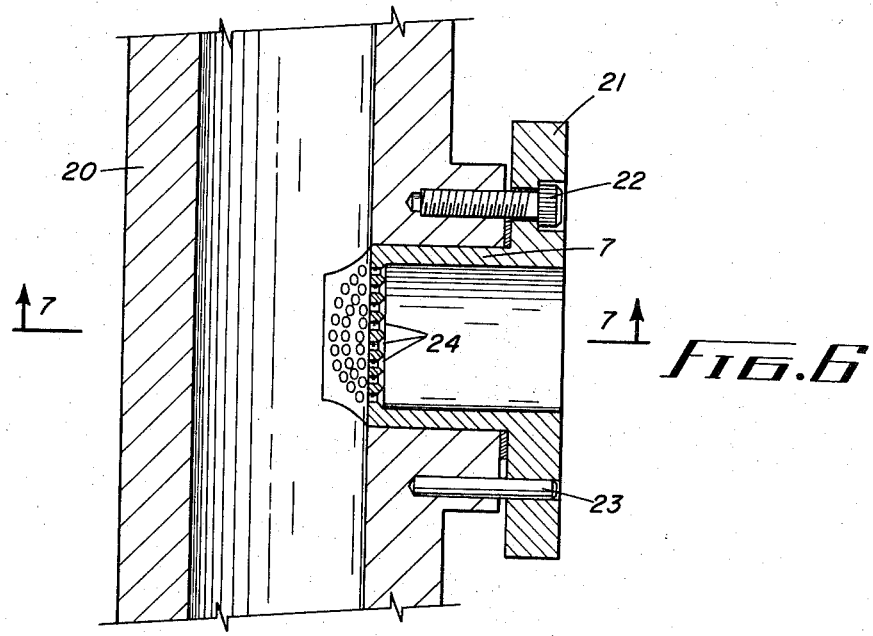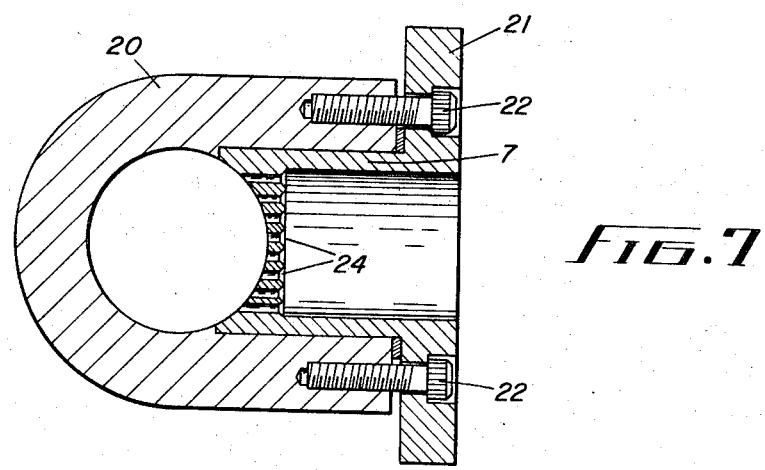

Feb. 15, 1972      D. L. SUTTER      3,642,752
APPARATUS AND PROCESS FOR PRODUCING NOVEL
EXTRUDED ACRYLIC SHEET
Filed Aug. 8, 1969      6 Sheets-Sheet 5

INVENTOR.
DAVID LORD SUTTER

BY James T. Dunn
ATTORNEY

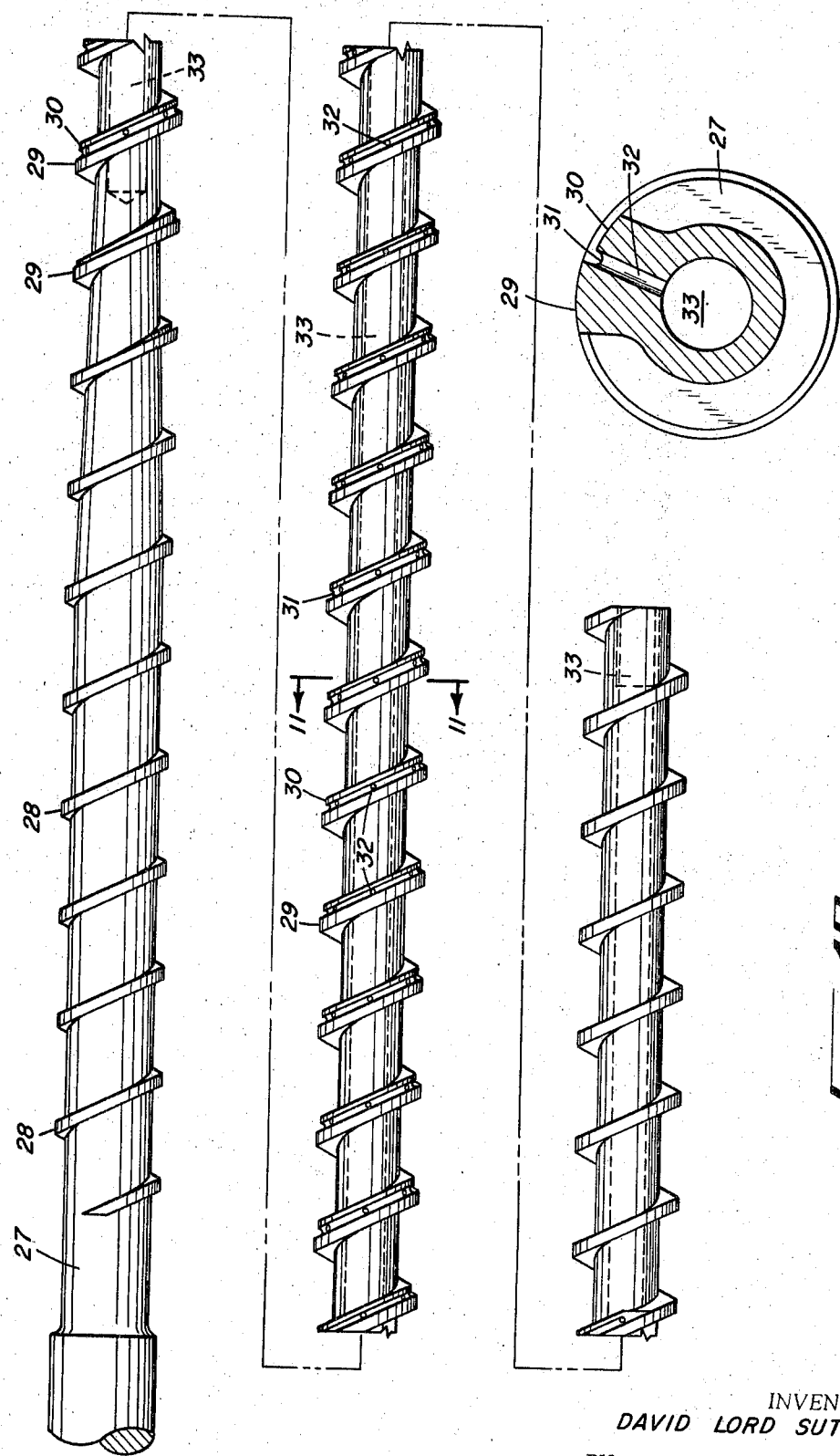

United States Patent Office
3,642,752
Patented Feb. 15, 1972

3,642,752
APPARATUS AND PROCESS FOR PRODUCING
NOVEL EXTRUDED ACRYLIC SHEET
David Lord Sutter, Kennebunkport, Maine, assignor to
American Cyanamid Company, Stamford, Conn.
Filed Aug. 8, 1969, Ser. No. 848,591
Int. Cl. C08f 3/68, 15/18
U.S. Cl. 260—89.5                        2 Claims

ABSTRACT OF THE DISCLOSURE

An apparatus for extruding and devolatilizing thermoplastic materials comprising a pair of cylinders each containing an extruder screw for processing polymeric thermoplastic materials and a link joining the cylinders. This invention also discloses a process for making the extruded polymeric thermoplastic sheet, and discloses a novel product produced according to the process of the present invention. Finally, there is disclosed a screw for use in the barrel of a screw extruder for forwarding material from the inlet end to the discharge end thereof.

BACKGROUND OF THE INVENTION

Cast polymeric thermoplastic sheet has been prepared for a substantial plurality of years in which a catalyzed monomeric polymerizable material or a catalyzed partially polymerized syrupy material is introduced into the void between a pair of plate glass sheets separated from one another by a suitable grommet. When the void between the glass plates has been filled with the polymerizable material, the inlet is sealed and the entire assembly is heated to the polymerization temperature for a sufficient period of time in order to accomplish the conversion of the polymerized material to a thermoplastic polymeric sheet. Upon cooling, the glass plates and the grommet are removed leaving a hard thermoplastic sheet which has a plurality of uses. The principal polymerizable monomer which is used in making such a cast sheet is methyl methacrylate, and homopolymers of methyl methacrylate have been made by the cast sheet technique. Frequently, copolymers of methyl methacrylate (MMA) with ethyl acrylate (EA) are produced by this process. In the copolymer, the methyl methacrylate is present in preponderant amounts such as about 95–98%, and the ethyl acrylate is present correspondingly in about 5%–2%. This cast sheet technique is a piecework operation, and each sheet has to be separately prepared and treated. This adds to the cost of production; and as a consequence, the resultant cast sheets cost significantly more than it would cost if a process could be developed which would produce sheet continuously of acceptable commercial quality. The instant apparatus and process enables such products to be produced; and the product thus produced has all of the advantageous properties of the cast sheet without any of the disadvantageous properties of sheet produced by other continuous extrusion methods.

FIELD OF THE INVENTION

This invention is in the field of apparatus and processes for the production of formed thermoplastic polymeric materials by an extrusion and devolatilization technique.

DESCRIPTION OF THE PRIOR ART

The prior art with which the instant applicant is familiar is represented by the U.S. Pats. 2,500,728, 2,836,851 and 3,376,371.

SUMMARY OF THE INVENTION

This invention relates to an apparatus for linking a pair of screw extruders with their axes perpendicular to each other, said apparatus comprising a hollow cylindrical member provided with a flange at one end thereof for securing said member to the outlet end of the first of said extruders and means for closing over the end thereof opposite said flanged end, said closing means being provided with a plurality of perforations therethrough and having a cylindrically concave arc defining its exterior surface, the axis of said arc being perpendicular to the axis of said cylindrical member. Still further, this invention also relates to a screw for use in the horizontal barrel of a screw extruder for forwarding material from the inlet end thereof to the discharge end thereof, said screw comprising a shank (a) provided with a main continuous helical material-advancing rib extending throughout the material forwarding section thereof, (b) a second continuous helical rib of lesser diameter than said main rib closely adjacent to the side of said main rib toward the inlet end of said screw and extending throughout a central portion of said shank, (c) a groove between and separating said main rib and said second rib, (d) an axial passageway extending from one end of said shank through the portion of said shank surrounded by said second rib and groove, and (e) a plurality of holes disposed within said groove providing communication between the axial passageway and the space between said main rib and said second rib. Still further, this invention relates to an apparatus for extruding and devolatilizing thermoplastic materials comprising a first and second cylinder, said first cylinder being vertically disposed and said second cylinder being horizontally disposed, the lower end of said first cylinder being connected to one end of the second cylinder by means of the linking apparatus described hereinabove, each of said cylinders having (a) an extruder screw, (b) a plurality of means for heating said cylinders, and for rotating said screws therein, means for feeding a thermoplastic material to the top of said first cylinder, said second cylinder having at least one means for applying a vacuum on said cylinder in order to remove volatiles from the thermoplastic material, said means being located upstream of said linking apparatus, said second cylinder having a shaping outlet at the downstream end. Still further, this invention relates to a process for extruding and devolatilizing thermoplastic polymeric materials utilizing certain particular temperature conditions, vacuum conditions as described in greater detail hereinbelow. Still further this invention relates to a novel formed polymer of methyl methacrylate which has all of the advantages of the polymers of the prior art without any of the disadvantages that have been detected in the polymers of the prior art.

BRIEF DESCRIPTION OF THE DRAWINGS

Referring now to the drawings:
FIG. 4 is a diagrammatic section of the vertical screw and housing.
FIG. 5 is a diagrammatical section of the horizontal screw and housing.
FIG. 6 is a plan section of the "spaghetti" nozzle coupled to the housing of the horizontal screw.
FIG. 7 is a vertical section of the "spaghetti" nozzle coupled to the horizontal screw housing.

FIG. 10 is an elevational view of the new screw having in its middle section two flights of screws, the rearward one being of lesser diameter than the forward one, and having a groove between.

FIG. 11 is a sectional view taken through 11—11 of FIG. 10.

The term "spaghetti" as used herein is descriptive of the appearance and form of the polymeric material as it is extruded through the plurality of holes in the link which joins the vertical screw housing with the horizontal screw housing.

Figure 1:
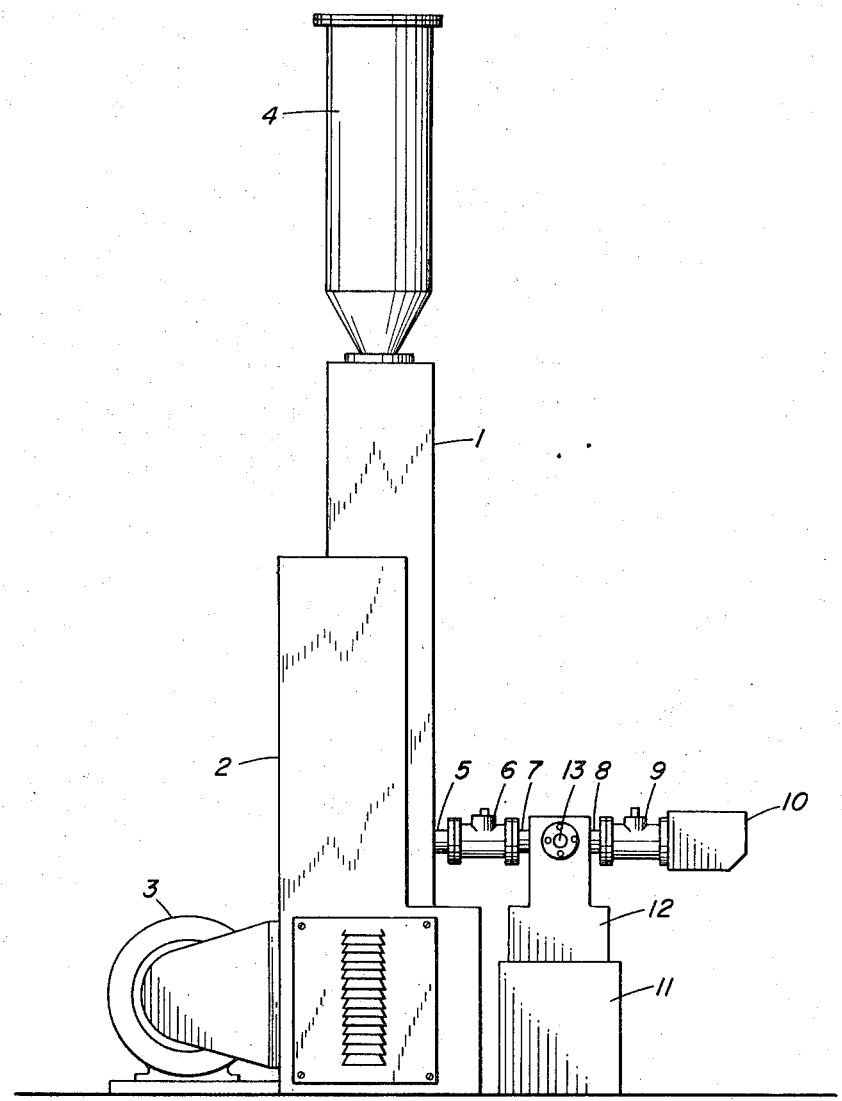
FIG. 1 is a side elevational view of the vertical extrusion housing with a side elevational view of the horizontal screw housing connected to the vertical extrusion housing.

In FIG. 1, the vertical housing 1 is a cylinder which houses the vertical screw. The housing 2 is used to contain the heating elements which control the temperature of the thermoplastic polymeric material as it is being worked downwardly by the screw extruder to the pipe 5, which leads the polymeric material over to the horizontal screw cylinder contained in the housing 12. The drive motor 3 is a variable speed drive and gear reducer. The support 11 provides a base on which the housing 12 rests, which housing accommodates the horizontal screw not shown. The connecting pipe 5 is attached to the pipe 6 which in turn is attached to the link 7 which is coupled to the cylinder housing of the horizontal screw unit. The orifice 13 provides for the application of a vacuum to the horizontal screw chamber so as to remove volatiles. At the downstream end of the horizontal screw chamber, there is the exit pipe 8 with the connector 9 and the forming die 10.

Figure 2:
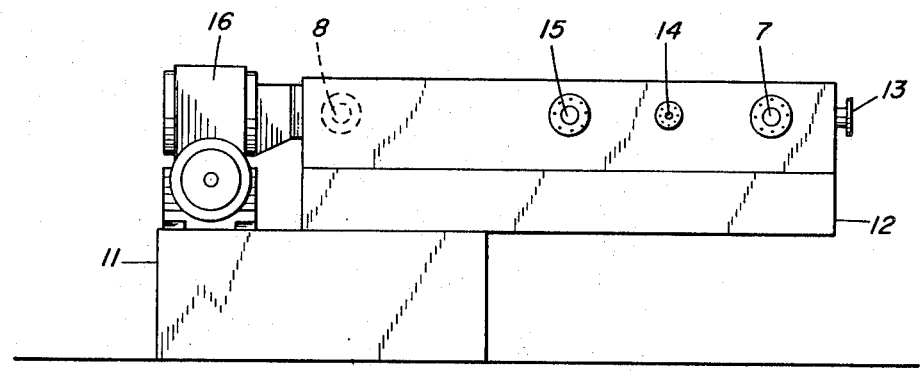
FIG. 2 is a side elevational view of the horizontal screw housing.

In FIG. 2, the support base 11 supports the housing 12 of the horizontal screw cylinder which is equipped with the inlet 7 link from which the thermoplastic material coming from the vertical extruder is introduced into the horizontal extruder. Vacuum may be applied at the port 13 and, if desired, also at the ports 14 and 15. The outlet 8 is shown in dotted section so as to indicate that it is on the reverse side from the inlet 7. A drive motor 16 at the downstream end of the horizontal screw extruder provides a variable speed drive for the screw.

Figure 3:
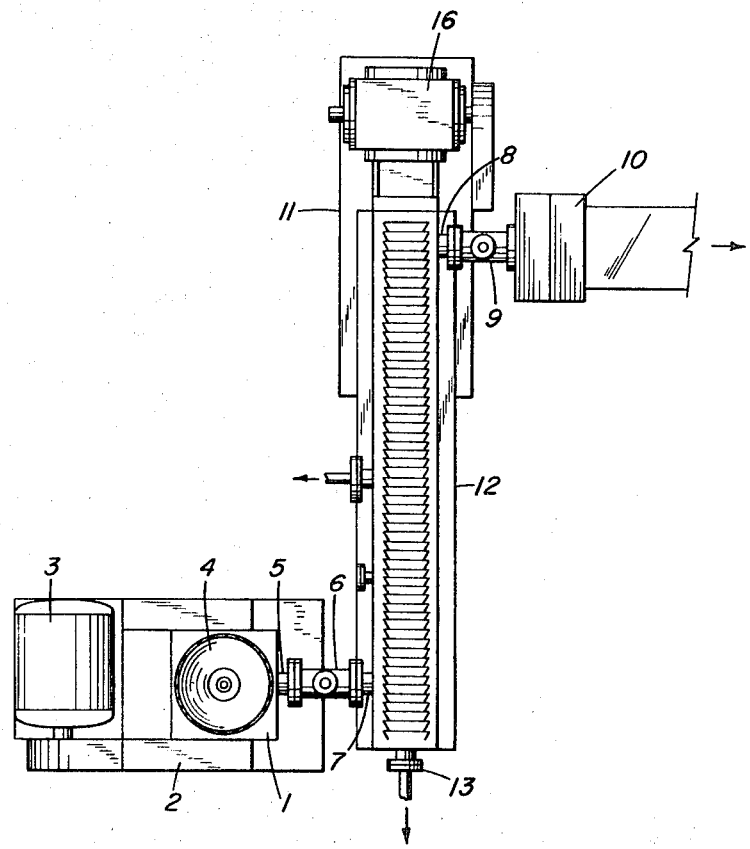
FIG. 3 is a plan view of the entire appartus showing the vertical screw housing connected to the horizontal screw housing.

FIG. 3 shows a plurality of these units from a different vantage point.

FIG. 4 shows a part of the hopper 4 into which the thermoplastic polymeric material is introduced preparatory to being worked by the vertical screw extruder 17 contained within the housing 18 and the polymeric material is worked downwardly and through the exit 5.

FIG. 5 shows the horizontal screw 19 contained in the housing 20 with the linking apparatus 7 having the flange 21 and the perforated apertures for introducing the feed into the horizontal screw extruder. Vacuum can be applied at the upstream aperture 13 and, if desired, also at the apertures 14 and 15. The product will be extruded out of the aperture 8.

FIG. 6 shows the linking apparatus 7 connected to the housing of the horizontal screw cylinder (horizontal screw not shown), and it is bolted to said housing by use of the bolts 22 recessed in the flange 21. The guide pin 23 is used to align the linking apparatus 7 so that the curvature at the extrusion end of the linking apparatus is in alignment with the internal circumference of the horizontal screw housing. The apertures 24 are the holes through which the polymeric material is extruded in the apparent form of "spaghetti."

In FIG. 7, there is shown the housing 20 of the horizontal screw extruder onto which is mounted the linking apparatus 7 made of the flange 21 and bolted to the housing 20 by use of the screws 22. The apertures 24, again, are indicated as providing the outlets through which the polymeric material passes in the apparent form of "spaghetti."

Figure 8:
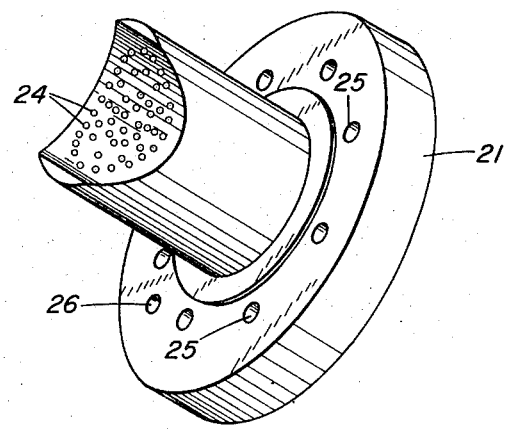
FIG. 8 is an isometric view of the "spaghetti" nozzle.
Figure 9:
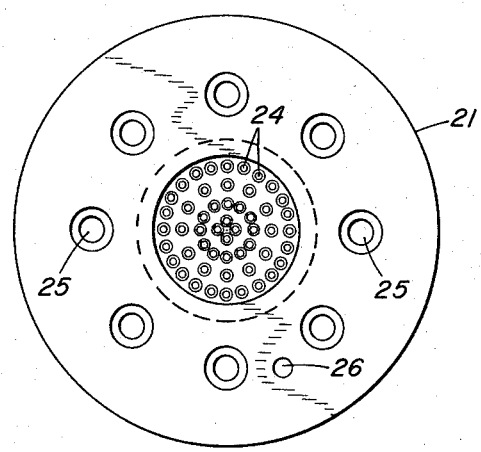
FIG. 9 is a front elevational view of the "spaghetti" nozzle from the flange side.

In FIGS. 8 and 9, there is shown the flange 21, the bolting holes 25, the alignment hole 26 to receive the alignment pin 23, and the apertures 24 through which the polymeric material passes in the apparent form of "spaghetti."

In FIGS. 10 and 11, the shaft 27 is provided with a plurality of continuous helical material advancing ribs 28 which become the helical material advancing rib 29 when it is joined by the second continuous helical material advancing rib 30 of lesser diameter than said main rib which is separated by the groove 31 and the axial passageway 33, which are joined to the source of vacuum through the holes 32.

In practicing the process of the present invention, one would start with a polymer of methyl methacrylate having a molecular weight between about 250,000 and 450,000; and preferably between about 3000,000 and 350,000 $\overline{MW}_v$ ($\overline{MW}_v$ is the molecular weight determined from measurements of reduced specific viscosity in chloroform). This polymeric material may be homopolymeric methyl methacrylate or copolymers of methyl methacrylate with another copolymerizable monomer wherein the methyl methacrylate is present preponderantly and the other monomer or monomers are present in amounts less than 50%. Preferably one would use at least 90–95 mol percent of methyl methacrylate, and correspondingly from about 10 to 5 mol percent to the corresponding polymerizable monomer. Other monomers which may be used with the methyl methacrylate are preferably selected from the acrylic family; such as ethyl acrylate, methyl acrylate, ethyl methacrylate; and the acrylic acids such as acrylic acid per se or methacrylic acid, and the like. One preferred formulation for making the polymeric material would reside in using about 98 mol percent of methyl methacrylate and 2 mol percent of ethyl acrylate. The polymeric material may also be a blend of a methyl methacrylate polymer and another polymer such as polybutadiene, polyethylene, ethylene/vinyl acetate copolymer, and the like. In such blends, the methyl methacrylate polymer amounts to more than 50%. These polymeric materials are prepared in advance of the processing in the apparatus of the present invention and may be described as being small particulate material prepared in a bead polymerization process or cast sheet or blocks which has been chopped to provide irregularly shaped patricles in the nature of granules or cubes. This polymeric material is introduced into the hopper 4 where it is worked downwardly through the cylinder 18 by virtue of the force exerted by the screw 17. As the polymeric material is being worked downwardly, there are a plurality of zones where the heating of the cylinder is accomplished. The total number of heating zones may be varied depending on the length of the vertical column. One can use, for instance, a total of four heating zones on the vertical column in which the temperatures are varied between about 440° F. and 650° F. It is generally preferred that the higher temperatures be in the middle heating zones or in the middle and lower heating zones. The linking zone that connects the vertical stage with the horizontal stage is heated so as to provide a comparable temperature for the material being worked so that it is in a substantially fluid state and is readily extruded through the perforations of the linking apparatus into the horizontal stage. The temperatures in the horizontal zone on the average run slightly lower than the temperatures on the vertical zone, and may be controlled between about 400° F. and 600° F. In order to eliminate entrained air and other volatiles, a vacuum is applied on the horizontal extruded rearwardly of the inlet port. By applying a second vacuum in the porthole 15 as well as at the porthole 13, the volume of sheet produced and the volume of starting material processed was increased from about 70 pounds per hour with 300,000 molecular weight material to about 90 pounds per hour. When the link melt temperature, although usually maintained at 510–520° F., was increased to about 580° F. in several steps, all traces of bubbles and other volatiles disappear even when the rate was increased to 125 pounds per hour with a polymeric material having a molecular weight of 316,000. These higher temperatures did not affect the final properties of the extrudate as will be shown hereinbelow. One can increase the temperature to those higher levels by increasing the vertical stage barrel temperature to 600° F. and maintaining maximum temperature on the linking valve. By doing this, the throughput increased as the temperatures increased. As the throughput was increased from 157 to 177 pounds per hour, maximum obtainable linking temperature decreased from 593 to 570° F. At throughputs in the region of 90 pounds per hour, the link melt temperature may be 10–15 degrees higher than the adapter, 6, melt temperature. If there is inadequate devolatilization, incipient bubbling can be present in apparently bubble-free sheet. The devolatilization is simplified by increasing the temperature which reduces the melt viscosity. Furthermore, lower melt temperatures can prevent bubbles from forming. With complete devolatilization, bubbles will not form at higher melt temperatures unless the temperature is responsible for degradation. When bubbles do occur in profusion, the melt fracture is in fact the result of rupture of the surface bubbles due to the velocity gradient near the surface of the die lips. When bubbles are eliminated at the melt temperature sufficiently high to permit a smooth surface, melt fracture will be eliminated entirely. In terms of thermal input to the resin, the first stage vertical extruder has been found to be capable of increasing the temperature of 150 pounds per hour of 310,000 molecular weight polymethyl methacrylate material to about 600° F. In terms of efficiency, a two inch tandem extruder system has been shown to be capable of delivering up to about 4.6#/horse power per hour of PMMA of about 310,000 molecular weight at a throughput of 125 pounds per hour considering the power drawn by both of the drive motors.

The extrudates were evaluated after production, and certain extrudates were evaluated for oven sag resistance, solvent craze resistance and terminal molecular weight. Additionally, on some samples further tests were run such as determination of residual monomer, Vicat softening point, deflection temperature under load, Barcol hardness, falling ball impact, thermal stability, and the like.

The oven sag resistance is a measure of the "hot strength" of a plastic, or its ability to support its own weight in an oven at temperatures encountered in the thermoforming process. In thermoforming, a sheet of plastic is hung in a oven by clamps along its upper edge, the plastic in the immediate vicinity of each clamp taking a portion of the total weight of the sheet. In the test, a one-inch wide strip is loaded with a weight equal to that of a sheet of the same thickness, 6" wide and 8' long. The loaded sample is hung in an oven at 300° F. for 15 minutes. The final length of an initial 2" gage length is measured while the sample is still hung in the oven. Two determinations are made on each extrudate, one each in the machine and cross-machine directions. The data shown hereinbelow reflects some of the sag values collected. A target of 30% had been established, because this was the sag of commercially available sheets; known to be acceptable to the sign industry. The following observations were made:

(a) Cast sheet of over 350,000 $\overline{MW}_v$ meets the sag objective.

(b) Sheet extruded from 98%–2% MMA–EA copolymer of over 275,000 $\overline{MW}_v$ meets the objective. Extrusion actually aids sag resistance, even though $\overline{MW}_v$ is decreased during extrusion.

(c) Sheet extruded from 95%–5% MMA–EA copolymer of 400,000 $\overline{MW}_v$ meets the objective. The additional EA appears to act as a plasticizer.

(d) Blends give sag values reasonably in line with their calculated $\overline{MW}_v$ and EA content.

Solvent craze resistance was determined by a modified Military Standard test. Samples were conditioned by heating in a 248° F. oven for two hours and subsequently holding in a 50% R.H. 20° C. room for 48 hours. Each sample, about 1" wide, was stressed as a cantilever to a calculated maximum fiber stress of 2000 p.s.i. A patch of filter paper on the specimen over the fulcrum was kept moist with isopropyl alcohol. At the end of 30 minutes the sample was removed and examined. One specimen was tested from the machine direction and cross-machine direction of each extrudate evaluted. Observations:

(a) Extruded sheet of 200,000 $\overline{MW}_v$ either ruptures in less than 30 minutes and/or crazes very badly.

(b) Extrudates of feedstocks of about 300,000 craze to about the same small degree as cell cast acrylic sheet of $1,000,000 + \overline{MW}_v$.

(c) Craze resistance appears to be a function of molecular weight and is surprisingly enhanced by extrusion.

(d) At a given $\overline{MW}_v$, not much difference can be detected between samples of 2% and 5% EA content.

Viscosity average molecular weights were determined on a number of extrudates as well as feedstocks. Observations:

(a) Decrease in $\overline{MW}_v$ during extrusion appeared to be a function of initial $\overline{MW}_v$. Higher $\overline{MW}_v$'s lost more during extrusion.

(b) Two percent EA polymers appeared to suffer a somewhat greater reduction of $\overline{MW}_v$ than 5% EA polymers.

Residual monomeric methyl methacrylate as determined by vapor phase chromatography, has been generally in the region of 0.5–0.7% for polymers of about 300,000 $\overline{MW}_v$, well within tolerance for cast sheet but higher than one would expect from conventional extruded sheet.

Thermal stability, as indicated by visual inspection of a specimen which has been held in a 356° F. oven for 2 hours, was determined for only one extrudate. This specimen exhibited no blisters, bubbles or other defects. Commercial extruded sheet blisters and sags catastrophically during this test, although high molecular weight cell cast acrylic generally passes.

In order that the concept of the present invention may be more completely understood, the following examples are set forth in Tables I and II in which the molecular weight of the starting materials and the temperature of the starting materials, the revolutions per minute of the screw extruder and the zone temperatures, link temperatures, melt temperatures, degree of vacuum, adapter temperature and die temperature for the vertical and horizontal stages are set forth.

TABLE I.—VERTICAL STAGE

| Example | 1 | 2 | 3 | 4 | 5 | 6 | 7 |
|---|---|---|---|---|---|---|---|
| MW ×10³ | 316 | 316 | 316 | 316 | 316 | 316 | 316 |
| Temp., °F | (¹) | (¹) | (¹) | (¹) | (¹) | (¹) | (¹) |
| R.p.m | 82 | 82 | 82 | 63 | 63 | 63 | 63 |
| Zone temp., °F.: | | | | | | | |
| 1 | 450 | 455 | 450 | 440 | 450 | 445 | 440 |
| 2 | 480 | 480 | 480 | 460 | 485 | 495 | 505 |
| 3 | 485 | 490 | 490 | 470 | 495 | 515 | 515 |
| 4 | 460 | 455 | 455 | 460 | 510 | 525 | 560 |
| Link temp., °F | 455 | 460 | 460 | 470 | 475 | 490 | 500 |
| Melt temp., °F | 530 | 528 | 530 | 517 | 529 | 545 | 555 |

¹ Room temperature.

TABLE II.—HORIZONTAL STAGE

| Example | 1 | 2 | 3 | 4 | 5 | 6 | 7 |
|---|---|---|---|---|---|---|---|
| Feed port No | 1 | 1 | 1 | 1 | 1 | 1 | 1 |
| Tail VAC, mm. Hg | 20 | 19 | 25 | 20 | 20 | 22 | 24 |
| Side VAC, mm. Hg | 25 | 25 | 25 | 20 | 20 | 22 | 24 |
| R.p.m | 144 | 162 | 130 | 116 | 116 | 116 | 116 |
| Zone temp., °F.: | | | | | | | |
| 1 | 425 | 415 | 415 | 400 | 430 | 425 | 415 |
| 2 | 425 | 420 | 425 | 440 | 440 | 435 | 420 |
| 3 | 405 | 405 | 410 | 420 | 480 | 430 | 405 |
| 4 | 485 | 490 | 500 | 490 | 495 | 495 | 495 |
| 5 | 445 | 460 | 450 | 440 | 440 | 440 | 440 |
| Adapter temp., °F | 490 | 478 | 470 | 470 | 467 | 462 | 460 |
| Melt temp., °F | 585 | 588 | 581 | 575 | 576 | 579 | 580 |
| Die temp., °F.: | | | | | | | |
| 1 | 480 | 480 | | 480 | 475 | 472 | 470 |
| 2 | 485 | 482 | | 480 | 482 | 480 | 478 |
| 3 | 480 | 480 | | 480 | 480 | 480 | 480 |

The extrudates of Examples 4, 5, 6 and 7 were subjected to a plurality of tests in order to establish the properties of these extrudates. These properties are set forth in Table III.

TABLE III.—PROPERTIES OF EXTRUDATES

| Example | Melt temp., °F. | | Thruput, lbs./hr. | Vicat softening point, °C. | Residual MMA, percent | Sag, percent | $\overline{MW}_v$ |
|---|---|---|---|---|---|---|---|
|  | Link | Adapter |  |  |  |  |  |
| 4 | 517 | 575 | 115 | 119 | 0.70 | 24 | 270 |
| 5 | 529 | 576 | 119.5 | 119 | .63 | 23 | 274 |
| 6 | 545 | 579 | 120 | 119 | .70 | 15 | 272 |
| 7 | 555 | 580 | 120 | 121 | .58 | 28 | 275 |

All of the experimentation referred to in Table I, II, and III was performed on a 2" diameter tandem extruder. Throughputs of machines of larger diameter may be projected on the basis of the ratio of the diameter's squared or cubed, a scaling-up technique well known to those skilled in the art of extrusion. On this basis, the output (for example) of a six-inch tandem unit could be expected to be in the range of 1100 to 3500 lbs./hour when a 2" unit has a capacity of 125 lbs./hour.

Furthermore, none of the feedstocks employed in these experiments contained any additives customarily employed to enhance thermal stability.

I claim:

1. A bubble-free, extruded sheet of a thermostable polymeric methyl methacrylate material consisting essentially of homopolymeric methyl methacrylate or copolymers of methyl methacrylate with another copolymerizable monomer, wherein the methyl methacrylate is present preponderantly and the other monomer is present in amounts of less than 50%, said material having a molecular weight of at least between about 250,000 and 450,000, having a sag value not greater than about 30%, having improved solvent craze resistance, having a residual methyl methacrylate monomer content of less than 1%, having improved impact strength and a greater degree of vacuum thermoformability, said material being prepared by introducing either a homopolymeric methyl methacrylate or a copolymer of methyl methacrylate with another copolymerizable monomer into the top of a vertical screw extruder and continuously working said material downwardly while heating it at a temperature between about 440° F. and 650° F., continuously extruding said material horizontally through a perforated link and into a horizontal screw extruder and continuously moving said material forward while simultaneously heating it at a temperature between about 400° F. and 600° F., applying a vacuum to the material being worked so as to remove volatiles, and continuously extruding the processed material through a sheet-forming slot and cooling the sheet thus produced to room temperature wherein said starting polymeric material has a molecular weight of between about 250,000 and 450,000.

2. A sheet according to claim 1 in which the molecular weight is between 270,000 and 350,000.

References Cited

UNITED STATES PATENTS

| 2,071,907 | 2/1937 | Tattersall | 260—89.5 A |
| 2,373,446 | 4/1945 | Beaton | 260—89.5 A |
| 2,373,488 | 4/1945 | Marks | 260—89.5 A |
| 2,500,728 | 3/1950 | Williams | 260—89.5 A |
| 2,689,982 | 9/1954 | Chynoweth | 260—89.5 A |
| 3,084,068 | 4/1963 | Munn | 260—89.5 A |
| 3,141,868 | 7/1964 | Fivel | 260—85.5 |
| 3,234,303 | 2/1966 | Bild et al. | 260—89.5 A |

HARRY WONG, Jr., Primary Examiner

U.S. Cl. X.R.

18—12 SM, 12SS; 259—7, 9; 260—86.1, 887, 897, 901; 264—102, 349

Case No. 23,050

UNITED STATES PATENT OFFICE
CERTIFICATE OF CORRECTION

Patent No. 3,642,752   Dated February 15, 1972

Inventor(s)   DAVID LORD SUTTER

It is certified that error appears in the above-identified patent and that said Letters Patent are hereby corrected as shown below:

Column 4, line 12, please change the figure "3000,000" to read --300,000--.

Column 4, line 22, after the word "to" and before the number "5", please insert the word --about--.

Column 4, lines 63 and 64, please change the word "extruded" to read --extruder--.

Column 7, Table III, please insert --000-- under the term "$\overline{MW}_v$."

Signed and sealed this 12th day of September 1972.

(SEAL)
Attest:

EDWARD M. FLETCHER, JR.
Attesting Officer

ROBERT GOTTSCHALK
Commissioner of Patents